US012738647B2

(12) United States Patent
Lee et al.

(10) Patent No.: US 12,738,647 B2
(45) Date of Patent: Sep. 15, 2026

(54) ANTENNA AND ELECTRONIC DEVICE COMPRISING SAME

(71) Applicants: Samsung Electronics Co., Ltd., Suwon-si (KR); SEOUL NATIONAL UNIVERSITY R&DB FOUNDATION, Seoul (KR)

(72) Inventors: Jaehyun Lee, Suwon-si (KR); Jungsuek Oh, Seoul (KR); Jaehoon Kim, Seoul (KR)

(73) Assignees: Samsung Electronics Co., Ltd., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 7 days.

(21) Appl. No.: 18/289,815

(22) PCT Filed: May 9, 2022

(86) PCT No.: PCT/KR2022/006565
§ 371 (c)(1),
(2) Date: Nov. 7, 2023

(87) PCT Pub. No.: WO2022/240095
PCT Pub. Date: Nov. 17, 2022

(65) Prior Publication Data

US 2024/0243473 A1 Jul. 18, 2024

(30) Foreign Application Priority Data

May 10, 2021 (KR) ........................ 10-2021-0060114

(51) Int. Cl.
*H01Q 3/46* (2006.01)
*H01Q 1/24* (2006.01)
*H01Q 9/04* (2006.01)

(52) U.S. Cl.
CPC ............... *H01Q 3/46* (2013.01); *H01Q 1/243* (2013.01); *H01Q 9/0414* (2013.01)

(58) Field of Classification Search
USPC .......................................................... 343/824
See application file for complete search history.

(56) References Cited

U.S. PATENT DOCUMENTS 10,177,453 B2 1/2019 Haziza et al.
10,297,900 B2 5/2019 Lee et al.
(Continued)

FOREIGN PATENT DOCUMENTS

CN 209786153 U 12/2019
CN 111817001 A 10/2020
(Continued)

OTHER PUBLICATIONS

Korean Office Action dated Jun. 20, 2025, issued in Korean Patent Application No. 10-2021-0060114.
(Continued)

*Primary Examiner* — Dimary S Lopez Cruz
*Assistant Examiner* — Brandon Sean Woods
(74) *Attorney, Agent, or Firm* — Jefferson IP Law, LLP

(57) ABSTRACT

The present disclosure relates to a 5th generation (5G) or 6th generation (6G) communication system for supporting a data transmission rate higher than that of a 4th generation (4G) communication system such as long term evolution (LTE). According to various embodiments, an antenna of a wireless communication system comprises: a first transmission line; a first layer including a plurality of opening parts; a second layer including a plurality of dielectrics; and a third layer in which a plurality of antenna elements corresponding to the plurality of dielectrics is arranged, wherein a first surface of each of the plurality of dielectrics can be arranged to face the first layer, a second surface of each of the
(Continued)

plurality of dielectrics, which is opposite to the first surface, can be arranged to face the third layer, and each of the plurality of antenna elements can be arranged to be positioned on the second surface of a corresponding dielectric from among the plurality of dielectrics.

9 Claims, 9 Drawing Sheets

(56) References Cited

U.S. PATENT DOCUMENTS

| | | | | |
|---|---|---|---|---|
| 10,317,512 | B2 | 6/2019 | Trotta et al. | |
| 10,326,205 | B2 | 6/2019 | Haziza | |
| 10,720,712 | B2 | 7/2020 | Foo | |
| 10,862,219 | B2 | 12/2020 | Haziza et al. | |
| 11,152,714 | B2 | 10/2021 | Jakoby et al. | |
| 11,462,825 | B2 * | 10/2022 | Shailendra | H01Q 3/26 |
| 2015/0288063 | A1 | 10/2015 | Johnson et al. | |
| 2019/0006746 | A1 * | 1/2019 | Ohtake | H01Q 3/44 |
| 2019/0260139 | A1 | 8/2019 | Jakoby et al. | |
| 2023/0361466 | A1 * | 11/2023 | Tang | H01Q 3/36 |

FOREIGN PATENT DOCUMENTS

| | | | | |
|---|---|---|---|---|
| CN | 211655054 | U | | 10/2020 |
| JP | 2006135764 | A | | 5/2006 |
| JP | 4259460 | B2 | | 4/2009 |
| JP | 5435338 | B2 | | 3/2014 |
| JP | 2021501532 | A | | 1/2021 |
| KR | 10-2014-0090165 | A | | 7/2014 |
| KR | 10-2016-0077002 | A | | 7/2016 |
| KR | 10-2017-0082799 | A | | 7/2017 |
| KR | 10-1865135 | B1 | | 6/2018 |
| KR | 10-2019-0042072 | A | | 4/2019 |
| KR | 20190042072 | A | * | 4/2019 |
| KR | 10-2020-0060975 | A | | 6/2020 |
| KR | 10-2020-0090142 | A | | 7/2020 |

OTHER PUBLICATIONS

Korean Notice of Allowance dated Jan. 27, 2026, issued in Korean Patent Application No. 10-2021-0060114.

* cited by examiner

ANTENNA AND ELECTRONIC DEVICE COMPRISING SAME

TECHNICAL FIELD

The disclosure relates normally to a wireless communication system and, more specifically, to an antenna and an electronic device including the same in a wireless communication system.

BACKGROUND ART

A review of the development of mobile communication from generation to generation shows that the development has mostly been directed to technologies for services targeting humans, such as voice-based services, multimedia services, and data services. It is expected that connected devices which are exponentially increasing after commercialization of 5G communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as "beyond-5G" systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the 1/10 radio latency thereof.

In order to accomplish such a high data transmission rate and an ultra-low latency, it has been considered to implement 6G communication systems in a terahertz band (for example, 95 GHz to 3THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

In beyond 5G (B5G) and 6G mobile communication systems, communication is performed using ultra-high frequency signals, and thus an efficient antenna system is required to mitigate path loss of radio waves and increase the transmission distance of radio waves. An antenna including a phase shifter may include an antenna element, a power amplifier, and a phase shifter.

DISCLOSURE OF INVENTION

Technical Problem

Based on the above discussion, the disclosure provides an antenna structure capable of performing beam steering via a dielectric in a wireless communication system and an electronic device including the same.

In addition, the disclosure provides a structure for reducing transmission line loss by using an antenna capable of performing beam steering via a dielectric instead of a phase shifter in a wireless communication system and an electronic device including the same.

In addition, the disclosure provides a structure capable of reducing manufacturing costs and miniaturizing an electronic device by using an antenna capable of performing beam steering via a dielectric instead of a phase shifter in a wireless communication system.

Solution to Problem

According to embodiments of the disclosure, an antenna of a wireless communication system may include a first transmission line, a first layer including a plurality of openings, a second layer including a plurality of dielectrics, and a third layer on which a plurality of antenna elements corresponding to the plurality of dielectrics are arranged, wherein a first surface of each of the plurality of dielectrics is disposed to face the first layer, a second surface opposite to the first surface of each of the plurality of dielectrics is disposed to face the third layer, and each of the plurality of antenna elements is disposed to be located on a second surface of the corresponding dielectric among the plurality of dielectrics.

According to embodiments of the disclosure, an electronic device of a wireless communication system may include a plurality of array antennas including a first antenna array, a radio frequency integrated circuit (RFIC), and a board on which the plurality of array antennas and the RFIC are arranged, wherein the first antenna array includes a first transmission line, a first layer including a plurality of openings, a second layer including a plurality of dielectrics, and a third layer on which a plurality of antenna elements corresponding to the plurality of dielectrics are arranged, a first surface of each of the plurality of dielectrics is disposed to face the first layer, a second surface opposite to the first surface of each of the plurality of dielectrics is disposed to face the third layer, and each of the plurality of antenna elements is disposed to be located on a second surface of the corresponding dielectric among the plurality of dielectrics.

Advantageous Effects of Invention

A device according to various embodiments of the disclosure enables minimizing the transmission line loss via an antenna capable of performing beam steering via a dielectric instead of a phase shifter.

A device according to various embodiments of the disclosure enables the fabrication of an antenna and an electronic device including the same at an effective cost via an antenna capable of performing beam steering via a dielectric instead of a phase shifter.

A device according to various embodiments of the disclosure enables miniaturizing an antenna and an electronic device including the same by using an antenna structure capable of performing beam steering via a dielectric instead of a phase shifter.

In addition, advantageous effects obtainable through the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

In relation to the description of the drawings, the same or similar reference numerals may be used for the same or similar elements.

MODE FOR THE INVENTION

Figure 1:
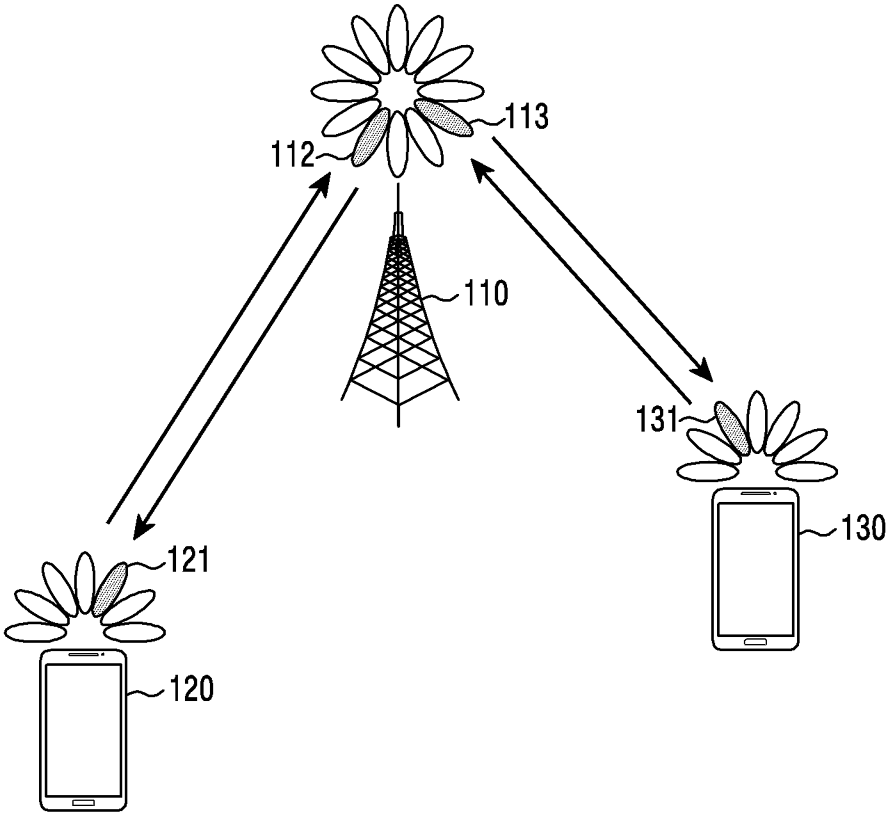
FIG. 1 shows an example of a wireless communication environment according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

In a structure of an array antenna, a structure in which a beam is formed by changing the phase of a radio frequency (RF) signal using a phase shifter consumes a lot of power and produces a lot of heat due to the phase shifter, thereby causing inefficiency such as loss. In addition, in the case of a mmWave band and a terahertz (THz) band used in B5G and 6G mobile communication systems, higher frequency bands are used than those used in LTE, and thus these losses are larger. Therefore, a low-loss, high-efficiency antenna and antenna structure are required.

Hereinafter, in the disclosure, a low-loss and high-efficiency antenna system capable of operating at ultra-high frequencies is proposed by designing an antenna including a dielectric (e.g., a metamaterial). An antenna structure according to embodiments of the disclosure may include a feeding unit for supplying a signal to a radiator, a liquid crystal unit for adjusting a phase of a signal while the fed signal is transmitted, and a radiator unit for radiating a signal.

A feeding unit of an antenna according to embodiments of the disclosure may use a single feed line, and thus loss may be reduced compared to multiple feed lines used in a general array antenna. For example, in the case of a dielectric resonator antenna, when a power divider-based multi-feed line is used, a feed line having a meandering structure is included. In other words, a dielectric resonant antenna must include a complex power supply system. However, an antenna structure of the disclosure may use a single straight feed line (e.g., a microstrip line structure), and thus fabrication may be simplified, and antenna performance may be easily predicted. As another example, in the case of a slot leaky wave antenna, a feeding unit may be designed as a single unit, but the feeding unit may include a liquid crystal unit, and thus there is a disadvantage that independent control is not possible for each radiator. Unlike this, in an antenna structure of the disclosure, a liquid crystal unit may be located between a feeding unit and a radiator unit, and may be independently controlled using DC power (e.g., voltage). The liquid crystal unit may serve to replace a phase shifter in a conventional array antenna system. Accordingly, when beam steering is performed, the antenna structure of the disclosure may perform beam steering with little power without having loss caused by a phase shifter.

In addition, in a radiator unit of an antenna according to embodiments of the disclosure, an antenna element may be disposed in a smaller area, compared to a conventional radiator which requires a size of half a wavelength or more. In particular, in an ultra-high frequency band such as a mmWave band or a THz band, as the frequency increases, the wavelength decreases, so that the size and spacing of a radiator of an antenna may be reduced, and thus it may be easy to design an antenna-in-package required for mounting in a terminal or a base station.

Hereinafter, terms referring to elements of a device used in the description of the disclosure (a substrate, a printed circuit board (PCB), a board, a line, a transmission line, a feeding line, an antenna, an antenna array, a sub-array, an antenna element, a feeding unit, a feeding point, a liquid crystal), terms referring to the shape of the configuration (an opening, a slot structure, a structure, a structure, a contact unit), and the like are illustrated for convenience of description. Accordingly, the disclosure is not limited to the terms described below, and other terms having equivalent technical meanings may be used.

In addition, the disclosure describes various embodiments using terms used in some communication standards (e.g., 3rd Generation Partnership Project (3GPP)), but this is only an example for explanation. Various embodiments of the disclosure may be easily modified and applied to other communication systems.

FIG. 1 shows a wireless communication system according to embodiments of the disclosure. FIG. 1 illustrates a base station 110, a terminal 120, and a terminal 130 as some of nodes using a radio channel in a wireless communication system. Although FIG. 1 shows only one base station, another base station identical or similar to the base station 110 may be further included.

The base station 110 is a network infrastructure which provides wireless access to terminals 120 and 130. The base station 110 has coverage defined as a predetermined geographical area based on a distance over which a signal may be transmitted. The base station 110 may be referred to as "millimeter wave (mmWave) equipment", "tera hertz equipment", an "access point (AP)", an "eNodeB (eNB)", a "5$^{th}$ generation node (5G node)", a "wireless point", a "radio unit (RU)", a "transmission/reception point (TRP)", or another term having equivalent technical meaning, besides a base station.

Each of the terminal 120 and the terminal 130 is a device used by a user and performs communication with the base station 110 via a radio channel. In some cases, at least one of the terminal 120 and the terminal 130 may be operated without user involvement. That is, at least one of the terminal 120 and the terminal 130 is a device which performs machine type communication (MTC) and may not be carried by a user. Each of the terminal 120 and the terminal 130 may be referred to as a "user equipment (UE)", a "mobile station", a "subscriber station", a "vehicle", a "customer premises equipment (CPE)", a "remote terminal", a "wireless terminal", an "electronic device", a "user device", or another term having equivalent technical meaning, besides a terminal.

The base station 110, the terminal 120, and the terminal 130 may transmit and receive wireless signals in a mmWave band or a THz band. The base station 110, the terminal 120, and the terminal 130 may perform beamforming to improve channel gain. Beamforming may include transmit beamforming and receive beamforming. That is, the base station 110, the terminal 120, and the terminal 130 may give directivity to a transmission signal or a reception signal. To this end, the base station 110 and the terminals 120 and 130 may select serving beams 112, 113, 121, and 131 via a beam search or a beam management procedure. After the serving beams 112, 113, 121, and 131 are selected, communication may be performed via a resource having a quasi co-located (QCL) relationship with a resource transmitting the serving beams 112, 113, 121, and 131.

The base station 110 or the terminals 120 and 130 may include an antenna array. Each antenna included in the antenna array may be referred to as an array element or an antenna element. Hereinafter, in the disclosure, the antenna array is illustrated as a two-dimensional planar array, but the antenna array is only one embodiment and does not limit other embodiments of the disclosure. The antenna array may be configured in various forms such as a linear array or a multilayer array. The antenna array may be referred to as a massive antenna array. Also, the antenna array may include a plurality of sub-arrays including a plurality of antenna elements.

The terminal 120 and the terminal 130 shown in FIG. 1 may support vehicle communication. In the case of vehicle communication, in an LTE system, standardization work with respect to vehicle-to-everything (V2X) (e.g., vehicle to vehicle (V2V), vehicle to infrastructure (V2I), etc.) technology was completed in 3GPP Release 14 and Release 15 based on a device-to-device (D2D) communication structure, and efforts are currently underway to develop V2X technology based on 5G NR. In NR V2X, unicast communication between terminals, groupcast (or multicast) communication, and broadcast communication are supported.

Figure 2:
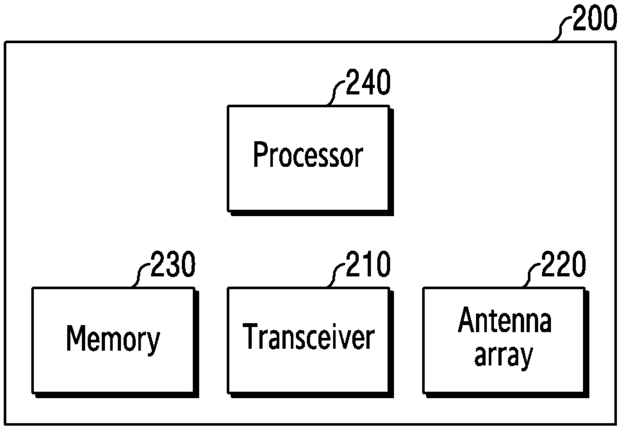
FIG. 2 shows a configuration of a beamforming device in a wireless communication system according to various embodiments of the disclosure.

FIG. 2 shows a configuration of a beamforming device in a wireless communication system according to embodiments of the disclosure. A beamforming device 200 illustrated in FIG. 2 may be understood as an element of the base station 110 or the terminals 120 and 130 of FIG. 1.

Referring to FIG. 2, a beamforming device 200 may include a transceiver 210, an antenna array 220, a memory 230, and a processor 240. The beamforming device 200 is illustrated as including one transceiver 210, one antenna array 220, one memory 230, and one processor 240, but FIG. 2 is merely an example for convenience of explanation, and the disclosure is not limited thereto. For example, the beamforming device 200 may include a plurality of antenna arrays 220, a plurality of transceivers 210, a plurality of processors 240, or a plurality of memories 240.

The transceiver 210 performs functions for transmitting and receiving signals via a radio channel. For example, the transceiver 210 performs a conversion function between a baseband signal and a bit string according to the physical layer standard of the system. For example, when data is transmitted, the transceiver 210 produces complex symbols by encoding and modulating the transmitted bit stream. In addition, when data is received, the transceiver 210 restores the reception bit stream by demodulating and decoding the baseband signal. In addition, the transceiver 210 up-converts the baseband signal into an RF-band signal, then transmits the up-converted signal via an antenna, and down-converts the RF-band signal received via the antenna into a baseband signal. For example, the transceiver 210 may include a transmit filter, a receive filter, an amplifier, a mixer, an oscillator, a DAC, an ADC, and the like.

In addition, the transceiver 210 may include a plurality of transmission/reception paths. In terms of hardware, the transceiver 210 may be configured of a digital circuit and an analog circuit (e.g., a radio frequency integrated circuit (RFIC)). A digital circuit and an analog circuit may be implemented in one package. In addition, the transceiver 210 may include a plurality of RF chains. Further, the transceiver 210 may perform beamforming.

As described above, the transceiver 210 transmits and receives a signal. Accordingly, a part of the transceiver 210 may be referred to as a "transmitter", or a "receiver". In addition, in the following description, transmission and reception performed via a radio channel are used to indicate that the above-described processing is performed by the transceiver 210.

The antenna array 220 radiates a signal produced by the transceiver 210 or receives a signal transmitted from the outside. The antenna array 220 may include a plurality of antenna elements. The directivity of a signal may be given by phase values of signals transmitted via a plurality of antenna elements. That is, the antenna array 220 may perform beamforming using the phase values. According to various embodiments, signals transmitted from the antenna array 220 may be radiated via a plurality of beams corresponding to a plurality of directions. The antenna array may include a plurality of unit cells (UCs) including antenna elements. The unit cell may include a dielectric having a dielectric rate. The dielectric constant of a dielectric may be determined according to the type of the dielectric.

The memory 230 stores data such as basic programs, application programs, and configuration information, for operation of the beamforming device. The memory 230 may be configured of a volatile memory, a non-volatile memory, or a combination of the volatile memory and the non-volatile memory. The memory 230 provides stored data according to a request of a memory 240. According to various embodiments, the memory 230 may store information for controlling a beam by using a dielectric.

The processor 240 controls overall operations of the beamforming device. For example, the processor 240 transmits and receives a signal via the transceiver 210. In addition, the processor 240 records data in the memory 230 and reads data therefrom. The processor 240 may perform protocol stack functions required by communication standards. To this end, the processor 240 may include at least one of a processor or a microprocessor, or may be a portion of a process. In addition, a part of the transceiver 210 and the processor 240 may be referred to as a communication processor (CP). According to various embodiments, the processor 240 may control the transceiver 210 to perform beamforming by applying a phase pattern for beam steering.

In the disclosure, a metamaterial may indicate a material artificially placed in a small area or volume shorter than the wavelength of a radio wave. When using a metamaterial, unlike general materials which may be obtained in nature, an electronic device may adjust the direction of a radio wave in a desired direction, or absorb or scatter a radio wave. In the case of using such a metamaterial, a high-efficiency antenna may be fabricated due to a higher antenna gain and lower attenuation by side lobes.

The transceiver 210 may form a phase difference between beams via a phase shifter. An array antenna may steer a beam in a specific direction so that signals radiated from each radiator are reinforced and interfered in a specific direction. The formation of the phase difference depends on the characteristics of the phase shifter and the path loss produced in the high frequency band is high, and thus a great number of antenna elements are required. A larger number of antenna elements may be required to produce a beam forming a narrow beamwidth in a specific direction.

Areas and volumes occupied by antenna elements for producing a beam may increase. In addition, a phase shifter and a power amplifier are required to be coupled to each of the antenna elements, and thus fabrication and production costs of the antenna may increase. In order to solve these problems, the disclosure proposes an antenna for steering a beam using a dielectric (e.g., a metamaterial) having a variable dielectric constant and an electronic device including the same. As the dependence of the phase shifter is lowered (or the phase shifter is not used), performance improvement, antenna fabrication, and production costs may be reduced.

Figure 3:
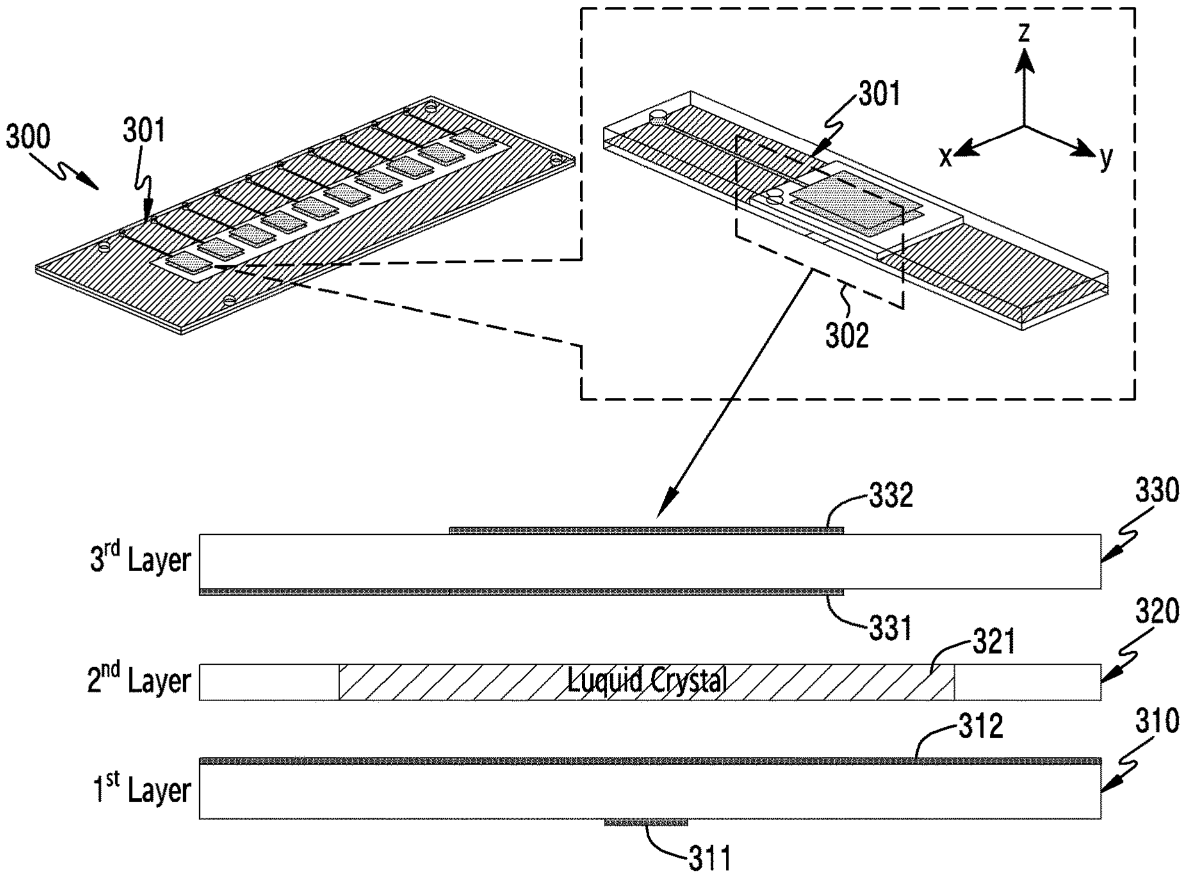
FIG. 3 shows an example of a structure of an antenna according to embodiments of the disclosure.

FIG. 3 shows an example of a structure of an antenna according to embodiments of the disclosure. In FIG. 3, an antenna including ten antenna elements, but this is only an example for convenience of explanation, and the disclosure is not limited thereto. For example, an antenna may include fewer than ten antenna elements (e.g., seven). In addition, for example, an antenna may include more than ten antenna elements (e.g., twenty).

Referring to FIG. 3, an antenna 300 may include a feeding unit 310, a liquid crystal unit 320, and a radiator unit 330. A stacked structure 302 indicates a state in which a unit cell 301 of the antenna 300 is viewed from the +x-axis direction to the −x-axis direction. The unit cell 301 may indicate a structure including one antenna element. That is, the stacked structure 302 shows an example of a cross section taken in a direction parallel to the yz plane of the unit cell 301 of the antenna 300.

Hereinafter, unless otherwise indicated in the disclosure, the feeding unit 310 may be referred to as a first layer, the liquid crystal unit 320 may be referred to as a second layer, and the radiator unit 330 may be referred to as a third layer.

According to an embodiment, the feeding unit 310 configuring the first layer may include a first transmission line 311, a metal layer 312, and a dielectric layer. The first transmission line 311 may include an array of at least one conductive line. For example, as shown in FIG. 3, the first transmission line 311 may indicate one conductive line. However, the disclosure is not limited thereto, and in an antenna structure including a plurality of arrays, a plurality of first transmission lines 311 may be arranged. In addition, the feeding unit 310 may indicate a microstrip including the first transmission line 311, a dielectric layer, and the metal layer 312, or a structure similar thereto. For example, the feeding unit 310 may indicate a form in which a microstrip configured of a metal layer, a liquid crystal layer, and a microstrip line from below with respect to the z-axis is inverted. In other words, the first transmission line 311 may indicate a microstrip line. According to an embodiment, the first transmission line 311 may indicate a line via which an RF signal passes. That is, the first transmission line 311 may indicate a line for feeding RF signals to radiators 331 and 332. For example, the feeding method may be an indirect feeding method by coupling. In addition, for example, the feeding method may include all direct feeding methods by direct contact of transmission lines, connectors, or the like.

According to an embodiment, the liquid crystal unit 320 configuring the second layer may include a liquid crystal 321. The liquid crystal 321 may indicate a dielectric capable of changing dielectric constant. According to an embodiment, the dielectric constant of the liquid crystal 321 may be changed based on a direct current (DC) voltage difference between the first radiator 331 and the metal layer 312. DC voltage may be applied to the first antenna element 331 by a second transmission line connected to one point of the first antenna element 331, and the metal layer 312 may operate as a ground (GND). Accordingly, a specific voltage may be applied to the liquid crystal 321 positioned between the first antenna element 331 and the metal layer 312. The dielectric constant of the liquid crystal 321 may be variable depending on the voltage, and thus when the DC voltage applied to the first antenna element 331 is changed, the voltage applied to the liquid crystal 321 may be changed. That is, as the voltage applied to the first antenna element 331 by the second transmission line is changed, the dielectric constant of the liquid crystal 321 (i.e., dielectric) may be changed.

In addition, the liquid crystal unit 320 may include the liquid crystal 321 capable of changing a phase of an RF signal transmitted via the first transmission line 311. The liquid crystal 321 may indicate a material capable of changing the phase of an RF signal. For example, the liquid crystal 321 may indicate a dielectric (e.g., metamaterial) having a variable dielectric constant. As described above, the dielectric constant of the liquid crystal 321 may be changed via a control signal such as a DC voltage or current, and accordingly, a phase of an RF signal may be changed. A control unit (e.g., a second transmission line) which adjusts the dielectric constant of the liquid crystal 321 of the liquid crystal unit 320 may reconfigure the liquid crystal 321 to form a phase difference between signals radiated via the radiators 331 and 332. According to an embodiment, the radiators 331 and 332 and the liquid crystal unit 320 may be designed in a one-to-one ratio. According to another embodiment, a plurality of radiators 331 and 332 may be designed to correspond to a single liquid crystal unit 320.

According to an embodiment, the radiator unit 330 configuring the third layer may include a plurality of radiators 331 and 332. For example, the radiator unit 330 may include ten first antenna elements 331 and ten second antenna elements 332. The first antenna element 331 and the second antenna element 332 may be radiators which radiate signals (e.g., RF signals) fed from the first transmission line 311. In addition, in the radiator unit 330, a plurality of antenna elements may be arranged in a stacked state in order to increase radiation performance and widen a frequency band of a radiated RF signal. For example, the radiator unit 330 may be disposed in a state where the first antenna element 331 and the second antenna element 332 are spaced apart from each other by a predetermined distance while being stacked in a corresponding area. The antenna elements 331 and 332 of the radiator unit 330 may be positioned corresponding to an area where the liquid crystal 321 of the liquid crystal unit 320 is located. For example, when a surface of the liquid crystal 321, facing the third layer, is referred to as a first surface and a surface thereof, facing the first layer, is referred to as a second surface, the first antenna element 331 may be disposed to be positioned in an area corresponding to the first surface. The metal layer 312 may be disposed in an area corresponding to the second surface of the liquid crystal 321.

According to an embodiment, a second transmission line for applying DC power may be connected to one point of the first antenna element 331. Referring to the stacked structure 302 of FIG. 3, unlike the second antenna element 332, the first antenna element 331 may be connected to a conductive member, and the conductive member may indicate a second transmission line. The second transmission line may be positioned in a potential zero region (PZR), as will be described later in FIG. 5B. PZR may indicate a region in which electrical energy does not change with time. For example, PZR may indicate a region in which electrical energy is zero. When the second transmission line is connected to the PZR, the effect on the AC signal supplied to the first antenna element 331 by the first transmission line 311 may be minimized. Matters related thereto will be described in detail in FIG. 5B below.

In addition, the structure of radiators of the radiator unit 330 shows a rectangular microstrip patch structure, but embodiments of the present disclosure are not limited thereto. According to another embodiment, the radiator (e.g., antenna element) of the radiator unit 330 may include at least one of various antenna radiator structures such as a microstrip patch antenna, a slot antenna, a dipole antenna, a standard horn antenna, and the like.

In addition, in a general array antenna (e.g., an antenna array including a dipole antenna), a gap of about half a wavelength ($\lambda/2$) of a radiated signal has been required for the distance between the antenna elements for beamforming. In contrast, the antenna structure according to embodiments of the disclosure may perform beamforming in which a detailed beam is formed by arranging antenna elements at intervals shorter than half a wavelength of a radiated signal compared to a general array antenna. In other words, according to embodiments of the disclosure, the distance between the antenna elements may be shorter than a predetermined distance, and thus the array antenna may vary the reference phase of a feed signal (e.g., RF signal) to compensate for the narrow variable phase range of the liquid crystal 321 (e.g., metamaterial). The predetermined interval may indicate half the length of a wavelength of a signal emitted from the radiator. That is, the antenna structure according to embodiments of the disclosure may perform sophisticated phase control for beam steering in a reduced structure compared to a general array antenna structure. Hereinafter, a detailed example of the stacked structure 302 of FIG. 3 will be described in FIG. 4.

Figure 4:
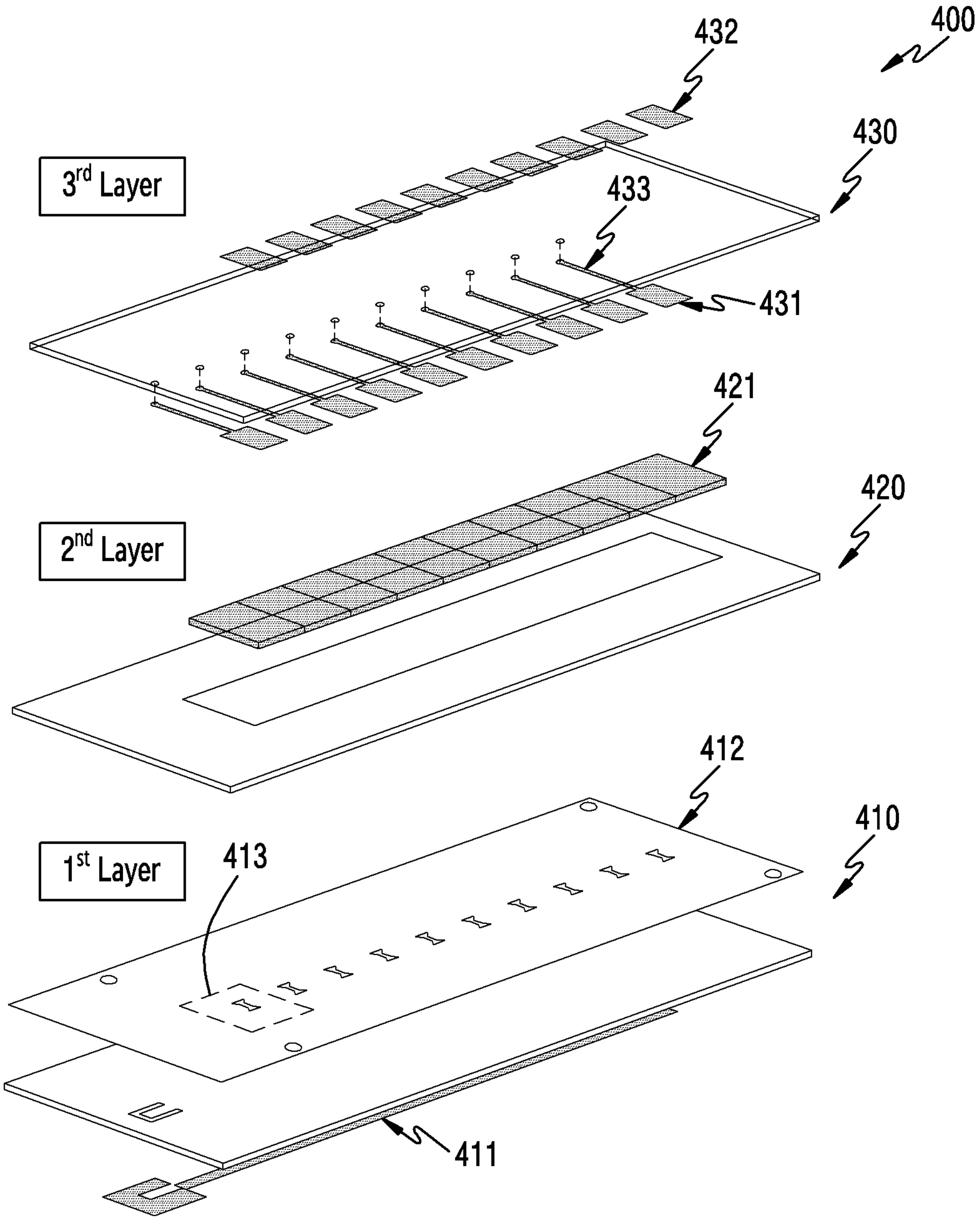
FIG. 4 is an exploded assembly view showing an example of a stacked structure of an antenna according to embodiments of the disclosure.

FIG. 4 is an exploded assembly view showing an example of a stacked structure of an antenna according to embodiments of the disclosure. An antenna 400 of FIG. 4 may be understood to be the same as the antenna 300 of FIG. 3. In other words, the description of the antenna 300 may be equally applied to the description of the antenna 400. In FIG. 4, an antenna including ten antenna elements is shown, but this is merely an example for convenience of explanation, and the disclosure is not limited thereto. For example, an antenna may include fewer than or more than ten antenna elements.

Referring to FIG. 4, the antenna 400 may include a feeding unit 410, a liquid crystal unit 420, and a radiator unit 430. According to an embodiment, the feeding unit 410 may include a first transmission line 411, a dielectric layer, and a metal layer 412. A signal (e.g., RF signal) may be transmitted or fed to the first transmission line 411 from a power supply source. The first transmission line 411 may transmit or feed the signal transmitted from the power supply source to the radiator unit 430. The first transmission line 411 may have a straight line structure in order to minimize loss produced while transmitting a signal. That is, by implementing the first transmission line 411 in a straight-line structure rather than a spiral structure or a meandering structure, it is possible to reduce loss caused by the transmission of signals along the first transmission line 411.

In addition, the metal layer 412 may include a plurality of openings 413. The opening 413 may indicate a passage through which a signal is transmitted from the first transmission line 411 to the radiator unit 430. For example, the opening 413 may have a rectangular structure, an L-shaped structure, or an H-shaped structure. The shape of the opening 413 will be described later with reference to FIG. 6. The opening 413 may be formed to be located in an area corresponding to the liquid crystal 421 of the liquid crystal unit 420 and antenna elements 431 and 432 of the radiator unit 430. The opening 413 may be disposed in an area corresponding to the liquid crystal 421 and the antenna elements 431 and 432 so as to change the phase of the signal via the liquid crystal 421 in the process of feeding the signal from the first transmission line 411 to the radiator unit 430.

According to an embodiment, the liquid crystal unit 420 may include a plurality of liquid crystals 421. For example, the liquid crystal unit 420 may include ten liquid crystals 421. The liquid crystal 421 may be formed of a dielectric having a variable dielectric constant. For example, the liquid crystal 421 may be a metamaterial.

In addition, the liquid crystal 421 may be disposed to be located in an area corresponding to the opening 413, a first antenna element 431, and a second antenna element 432. In addition, the liquid crystal 421 may change the phase of a signal passing through the opening 413 from the first transmission line 411. This phase change may be used to steer a beam formed by a plurality of antenna elements. By changing the dielectric constant of the liquid crystal 421, the phase of the signal may be changed. The dielectric constant of the liquid crystal 421 may be changed by DC power (e.g., voltage) applied between the first antenna element 431 disposed on the first surface of the liquid crystal and the metal layer 412 disposed on the second surface of the liquid crystal. Specifically, DC power may be applied by a second transmission line 433 connected to the first antenna element 431 at one point, and the metal layer 412 may operate as a ground (GND). A specific voltage may be applied to the liquid crystal 421 disposed between the first antenna element 431 and the metal layer 412, and accordingly, the dielectric constant of the liquid crystal 421 may be determined. The specific voltage may change as the DC power of the second transmission line changes, and thus the dielectric constant of the liquid crystal 421 may change.

According to an embodiment, the radiator unit 430 may include a plurality of radiators. For example, the radiator unit 430 may include ten first antenna elements 431 and ten second antenna elements 432. In addition, each of the plurality of first antenna elements 431 may be connected to a corresponding second transmission line at one point. The second transmission line may indicate a conductive member for applying DC power to the metal patch which is the first antenna element 431. According to an embodiment, the first antenna element 431 may be disposed in an area corresponding to the liquid crystal 421 and the opening 413, and the second antenna element 432 may be disposed in an area corresponding to the first antenna element 431, the liquid crystal 421, and the opening 413. For example, the first antenna element 431 may be disposed on the first surface of the liquid crystal 421. Accordingly, a signal which has passed through the opening 413 from the first transmission line 411 and has changed the phase thereof by the liquid crystal 421 may be supplied to the first antenna element 431. In addition, the first antenna element 431 may radiate the fed signal. According to an embodiment, the second antenna element 432 may be disposed in a stacked state with the first antenna element 431. Accordingly, the second antenna element 432 may serve as an auxiliary radiator for increasing radiation performance and widening a frequency band. Hereinafter, in FIGS. 5A and 5B, the principle of phase change of a signal using the radiator unit 430 and the liquid crystal 421 described above is described.

Figure 5A:
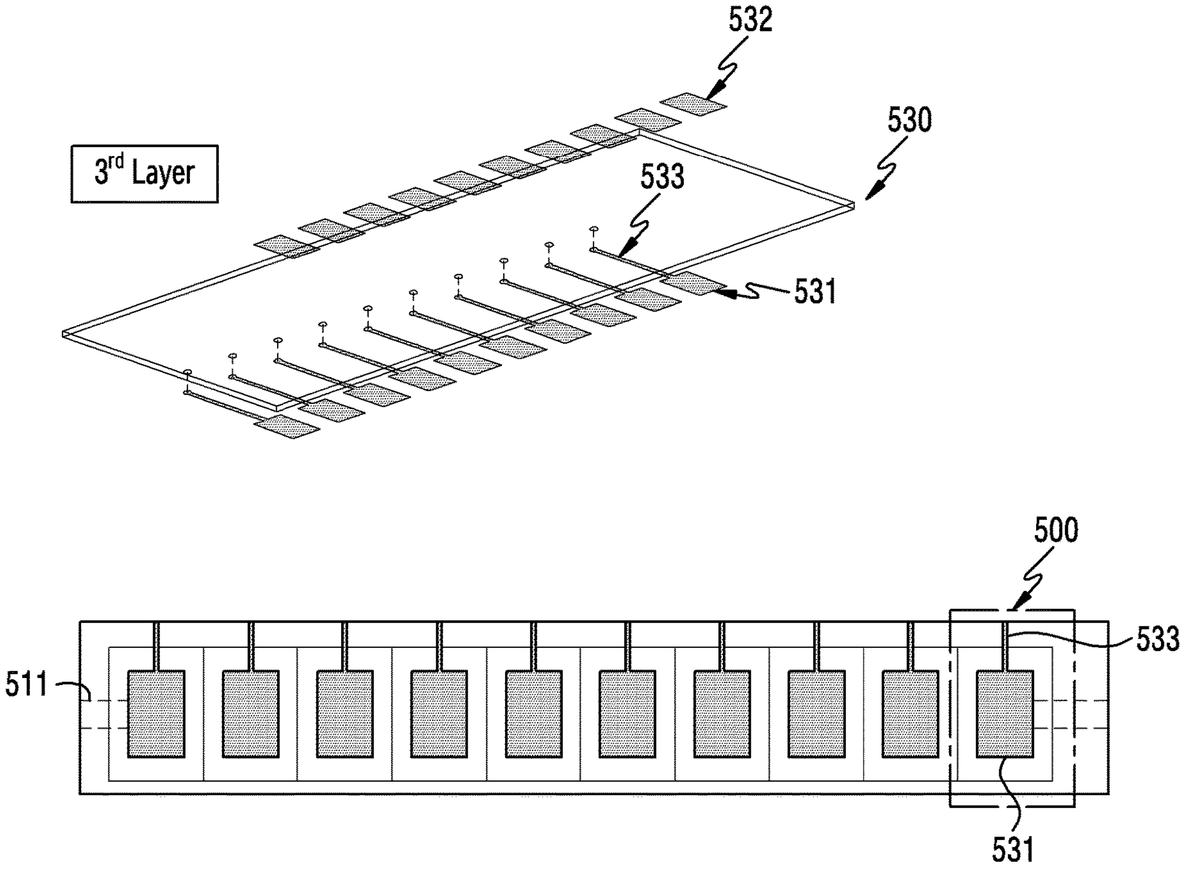
FIG. 5A shows an example of a radiator unit of an antenna according to embodiments of the disclosure.

FIG. 5A shows an example of a radiator unit of an antenna according to embodiments of the disclosure. A radiator unit 530 of FIG. 5A may be understood to be the same as the radiator unit 330 of FIG. 3 and the radiator unit 430 of FIG. 4. That is, the description of the radiator unit 330 or the radiator unit 430 may be equally applied to the description of the radiator unit 530. FIG. 5 shows the radiator unit 530 including ten antenna elements, but this is only an example for convenience of explanation, and the disclosure is not limited thereto. For example, the radiator unit 530 may include fewer than or more than ten antenna elements.

Referring to the diagram shown at the top of FIG. 5A, the radiator unit 530 may include a plurality of first antenna elements 531 and a plurality of second antenna elements 532. For example, the radiator unit 530 may include ten first antenna elements 531 and ten second antenna elements 532. According to an embodiment, the first antenna element 531 may be connected to a second transmission line 533 at one point. One point at which the second transmission line 533 is connected to the first antenna element 531 may indicate a point at which a change in electrical energy over time is minimal. For example, one point where the second transmission line 533 is connected to the first antenna element 531 may be a potential zero region (PZR). PZR may indicate a region in which electrical energy does not change over time. For example, PZR may mean a region in which electrical energy is zero. When the second transmission line 533 is connected to the PZR, the effect on an AC signal fed to the first antenna element 531 by a first transmission line 511 may be minimized.

The second transmission line 533 may be disposed to transmit power to the first antenna element 531. The second transmission line 533 may change the phase of a signal fed from the first transmission line 511 by feeding DC power to the first antenna element 531. When DC power is fed via the second transmission line 533, the dielectric constant of liquid crystal (not shown) may be changed. As the dielectric constant of the liquid crystal changes, the phase of the signal passing through the liquid crystal from the first transmission line 511 may change. That is, the second transmission line 533 may function as one element of a controller (control unit).

The drawing at the lower side of FIG. 5A corresponds to a plan view of the radiator unit 530 when the radiator unit 530 shown at the top of FIG. 5A is viewed vertically downward from above. Referring to the radiator unit 530 at the bottom of FIG. 5A, a plurality of the first antenna elements 531 of the radiator unit 530 may be arranged along the first transmission line 511. By this arrangement, a signal may be fed to each of the plurality of first antenna elements 531 from the first transmission line 511. The drawing at the lower side of FIG. 5A corresponds to a plan view of only the first antenna element 531, the second transmission line 533, and the first transmission line 511, but the disclosure is not limited thereto. In other words, the drawing at the lower side of FIG. 5A corresponds to a plan view of only the relationship between the first antenna element 531 and the first transmission line 511 for convenience of explanation, but the second antenna element 532 may be disposed in an area where the first antenna element 531 is disposed.

Referring to an area 500, the first transmission line 511 may be arranged to satisfy a specific condition with the second transmission line 533. For example, the first transmission line 511 may be arranged to be orthogonal to the second transmission line 533 on a plane. The fact that the first transmission line 511 and the second transmission line 533 are orthogonal to each other on a plane may be substantially related to the distribution of electrical energy formed in the first antenna element 531 by a signal fed from the first transmission line 511 to the first antenna element 531. This will be described in detail in FIG. 5B.

Figure 5B:
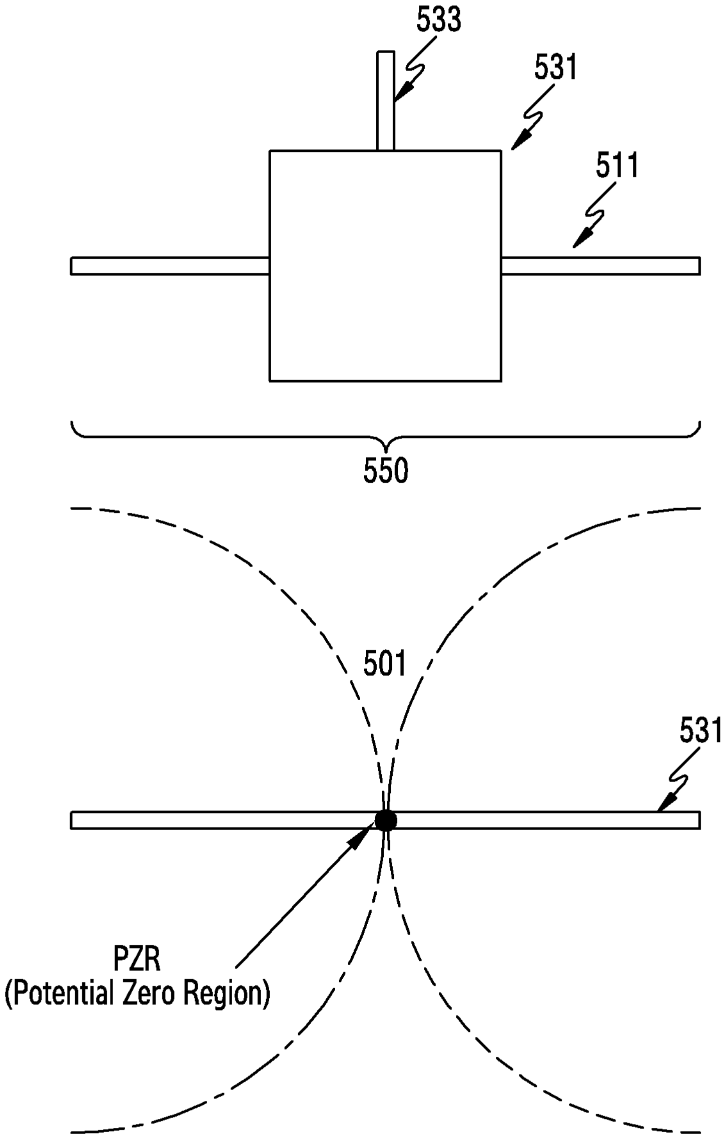
FIG. 5B shows an example of a coupling state between a radiator of an antenna and transmission lines according to embodiments of the disclosure.

FIG. 5B shows an example of a coupling state between a radiator of an antenna and transmission lines according to embodiments of the disclosure. FIG. 5B shows only the first antenna element, the first transmission line, and the second transmission line, but this is for convenience of explanation, and the disclosure is not limited thereto. For example, the second antenna element may be additionally disposed in a stacked state in an area corresponding to the first antenna element, spaced apart from each other by a predetermined distance.

Referring to FIG. 5B, the area 500 of FIG. 5A may be simplified to an area 550 of FIG. 5B. In other words, the area 550 of FIG. 5B may be understood to be the same as the area 500 of FIG. 5A. In the area 550 of FIG. 5B, the first transmission line 511 may be formed under the first antenna element 531 to be spaced apart therefrom by a predetermined distance. The second transmission line 533 may be connected to one point of the first antenna element 531. The first transmission line 511 and the second transmission line 533 may be arranged in directions orthogonal to each other on a plane. By arranging the first transmission line 511 and the second transmission line 533 to be orthogonal to each other on a plane, DC power fed from the second transmission line 533 to the first antenna element 531 is allowed to minimize interference acting on a signal radiated by the first antenna element 531.

The drawing 501 shows a state of the area 550 in a view from the horizontal direction of the first antenna element 531. Referring to the drawing 501, electrical energy distribution in the first antenna element 531 may be changed by a signal (e.g., RF signal) fed from the first transmission line 511 to the first antenna element 531. For example, electrical energy at both ends of the first antenna element 531 may have a maximum or minimum value. In addition, electrical energy may have a value of 0 at midpoints of both ends of the first antenna element 531. This may be because the AC signal fed from the first transmission line 511 may vary over time, but the width of the radiator (e.g., the first antenna element 531) is formed to have a length corresponding to half of the wavelength of the signal. Therefore, the midpoint of both ends of the first antenna element 531 may indicate a point at which a change in electrical energy over time is minimal, which may be referred to as a potential zero region (PZR). When the second transmission line 533 is connected to the PZR, the effect on the AC signal fed to the first antenna element 531 by the first transmission line 511 may be minimized.

According to an embodiment, the second transmission line 533 may be connected to the first antenna element 531 in a PZR region of the first antenna element 531. The first antenna element 531, which is a radiator, may be connected to the second transmission line 533 (e.g., a metal line) for applying DC power (e.g., voltage) to a potential zero region (PZR). The second transmission line 533 is connected to the PZR region, and thus the influence of the high-frequency signal may be minimized without an additional element (e.g., an inductor) for an RF choke. That is, the second transmission line 533 may apply a DC voltage to the first antenna element 531 using a simple structure without an additional element. Therefore, the antenna structure according to embodiments of the disclosure may implement an antenna including a flat radiator without a protruding structure, and may reduce design cost of the configuration for DC power feeding.

Referring to FIGS. 3 to 5B, the antenna structure according to embodiments of the disclosure may perform beamforming and beam steering by changing the dielectric constant of liquid crystal without using a phase shifter. The second transmission line 533 may feed DC power to the first antenna element 531, and accordingly, the dielectric constant of liquid crystal (not shown) disposed between the first antenna element 531 and the metal layer (not shown) of the feeding unit may be changed. As the dielectric constant of the liquid crystal is changed, the phase of the signal fed from the first transmission line 511 may be changed while passing through the liquid crystal after passing through the opening of the metal layer (not shown). Accordingly, as each of the same signals fed from the first transmission line 511 passes through the plurality of liquid crystals, a phase difference between the signals having passed through the plurality of liquid crystals may be formed. Signals having passed through the plurality of liquid crystals may be radiated by being fed or transmitted to the corresponding first antenna elements 531. A beam may be formed by combining signals radiated by a plurality of antenna elements. In addition, by changing the dielectric constant of each of the plurality of liquid crystals via DC power, the antenna according to embodiments of the disclosure may perform beam steering. In the antenna according to embodiments of the disclosure, dielectric constants of a plurality of liquid crystals arranged in the liquid crystal unit may be adjusted. For example, a plurality of liquid crystals arranged in the liquid crystal unit may be adjusted to have different dielectric constants. In addition, for example, some liquid crystals among a plurality of liquid crystals arranged in the liquid crystal unit may be adjusted to have the same dielectric constant. According to an embodiment, a plurality of liquid crystals may be controlled by the second transmission line.

Figure 6:
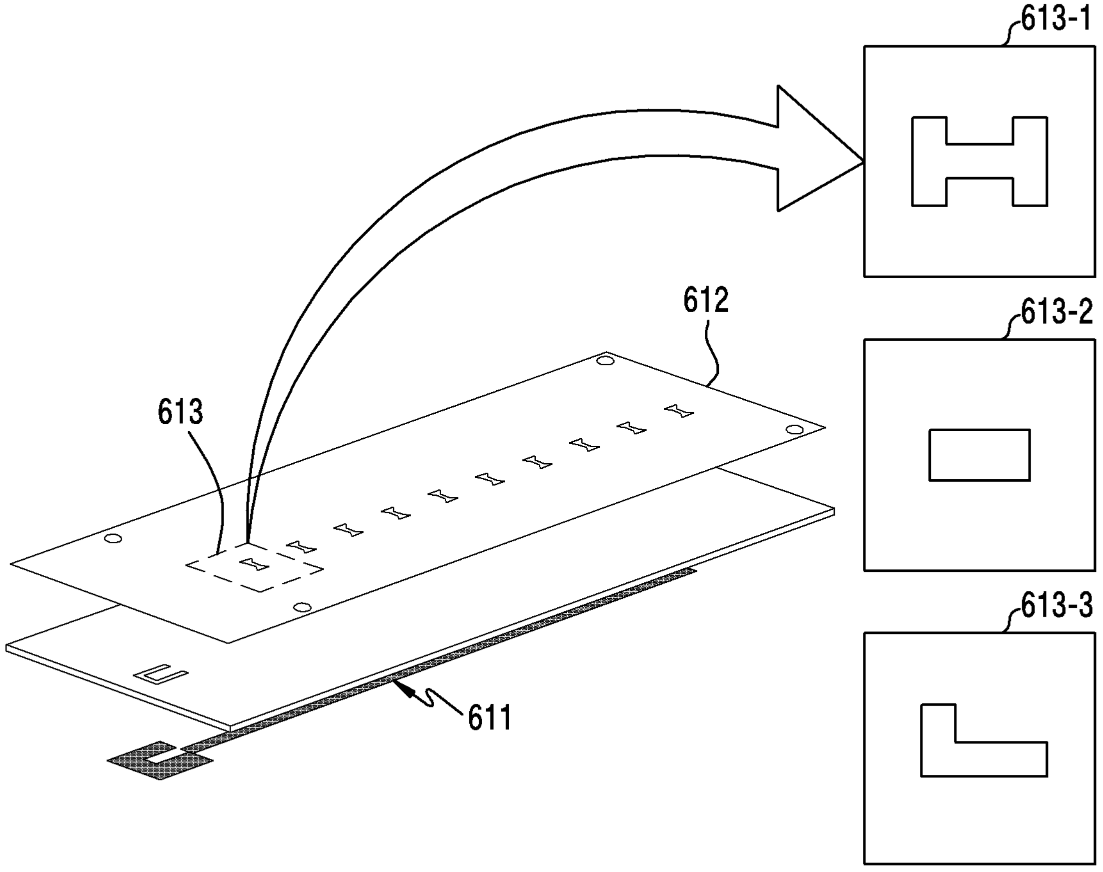
FIG. 6 shows various examples of an opening of an antenna according to embodiments of the disclosure.

FIG. 6 shows various examples of an opening structure of an antenna according to embodiments of the disclosure. A feeding unit of FIG. 6 may be understood to be the same as the feeding unit 310 of FIG. 3 or the feeding unit 410 of FIG. 4. Therefore, the description of the feeding unit 310 or the feeding unit 410 may be equally applied to the feeding unit of FIG. 6. FIG. 6 shows a metal layer 612 including one first transmission line 611 and ten openings 613, but this is for convenience of explanation and the disclosure is not limited thereto. For example, the feeding unit may include two arrays, and each array may include a metal layer including five openings and one first transmission line.

Referring to FIG. 6, a feeding unit may include a first transmission line 611, a metal layer 612, and a dielectric layer disposed between the first transmission line 611 and the metal layer 612. The dielectric layer indicates a dielectric layer different from the liquid crystal of the liquid crystal unit. In addition, the feeding unit of FIG. 6 may indicate a microstrip or a structure similar thereto.

According to an embodiment, the first transmission line 611 may be formed in a straight line structure. Such a straight line structure may reduce loss caused by a transmission line during signal transmission. In addition, the metal layer 612 may include a plurality of openings 613 along the first transmission line 611. The plurality of openings 613 may be arranged in an area corresponding to the liquid crystals of the liquid crystal unit. For example, one opening 613 among the plurality of openings 613 may be disposed to be positioned in an area corresponding to a second surface (here, the second surface may indicate one surface of a liquid crystal facing the first layer as described above) of one corresponding liquid crystal among the plurality of liquid crystals. Signals (e.g., RF signals) fed by the first transmission line 611 may pass through the plurality of openings 613 to be transmitted to the plurality of liquid crystals corresponding thereto.

According to an embodiment, the openings 613 may be formed in various structures. For example, the opening 613-1 may be formed in an H-shaped structure. As another example, the opening 613-2 may have a rectangular structure. As still another example, the opening 613-3 may be formed in an L-shaped structure. The structure of the opening 613 may indicate a path for a signal emitted from the first transmission line 611 to enter the liquid crystal. A signal incident on the liquid crystal may pass through the liquid crystal to be fed to a radiator (e.g., the first antenna element or the second antenna element) and radiated. Referring to FIG. 6, the feeding unit of the antenna structure according to embodiments of the disclosure may be formed in an H-shaped opening or a rectangular or L-shaped structure, and a plurality of openings may be included in the metal layer. In addition, in an antenna structure of the disclosure, a straight line-shaped transmission line (e.g., a microstrip line), which does not have a structure of a transmission line (e.g., a spiral line or a meandering line) used in a general dielectric array antenna structure, may be used. Accordingly, the antenna structure of the disclosure may shorten the signal transmission path, and thus insertion loss caused by transmission lines may be reduced and interference between adjacent radiators (e.g., antenna elements) may be minimized. Hereinafter, an example of an antenna structure and beam steering performance according to embodiments of the disclosure is described in FIG. 7.

Figure 7:
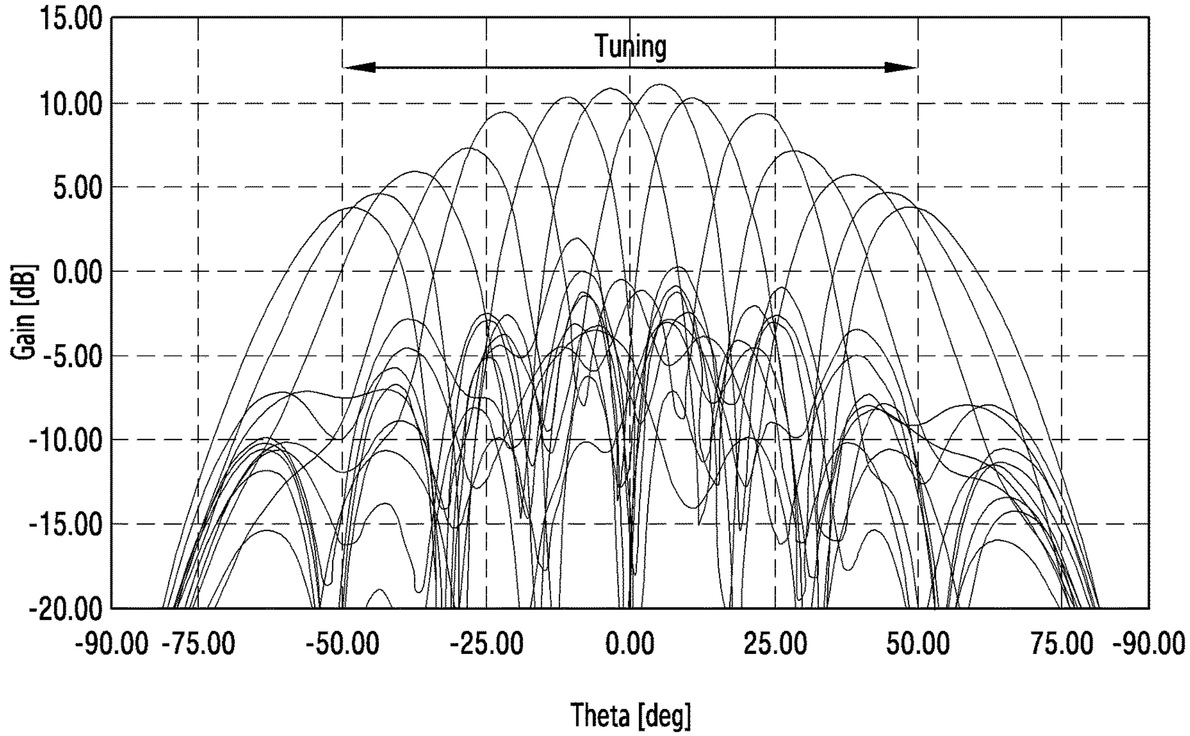
FIG. 7 shows an example of a graph showing radiation patterns of an antenna according to embodiments of the disclosure.

FIG. 7 shows a graph showing radiation patterns of an antenna according to embodiments of the disclosure. The radiation pattern may indicate a pattern of signals radiated from radiators of an antenna.

Referring to FIG. 7, a graph 700 illustrating an antenna radiation pattern according to adjusting the phase of a radiated signal is shown. Adjustment of the phase of the radiated signal may be controlled by changing the dielectric constant of the liquid crystal through which the signal passes by the DC power source. The horizontal axis of the graph 700 may indicate the angle (theta) (unit: degree) to the phase of the radiated signal, and the vertical axis of the graph 700 may indicate the gain (unit: decibel (dB)) for the radiated signal.

Referring to the graph 700, when the phase of the radiation signal is adjusted by changing the dielectric constant of liquid crystal (LC), the gain of the radiation signal may change. For example, when the phase of the signal is 0°, the gain of the radiated signal may be about 11 dB. As another example, when the phase of the signal is controlled to be about +50° by changing the dielectric constant of liquid crystal, the gain of the radiated signal may be about 4 dB. In addition, even when the phase of the signal is controlled to be about −50°, the gain of the radiated signal may be about 4 dB. That is, by changing the dielectric constant of the liquid crystal (liquid crystal tuning, LC tuning), the phase of the radiated signal may be adjusted, and the gain of the radiated signal may be maintained at a high gain.

Referring to FIGS. 3 to 7, the antenna structure according to embodiments of the disclosure may reduce the size of the antenna structure and maintain high radiation performance compared to the structure of the conventional array antenna. For example, compared to an array antenna including a phase shifter, an antenna structure according to embodiments of the disclosure may perform beam steering by adjusting a phase of a signal using liquid crystal. Accordingly, the antenna structure according to embodiments of the disclosure does not use a phase shifter, and thus the antenna structure may be miniaturized and additional loss caused by the phase shift may not occur. Additionally, when performing beam steering via a dielectric, the spacing between radiators of the antenna structure may be formed narrower than that of an antenna structure using a phase shifter, and thus the antenna structure according to embodiments of the disclosure may be formed as a relatively smaller structure. In addition, as the distance between radiators narrows, the reference phase of the signal may change. Accordingly, the antenna structure of the disclosure may compensate for the narrow variable phase range of the dielectric by changing the reference phase of the signal, and may perform precise phase control. In addition, as the antenna structure according to embodiments of the disclosure is formed in a state in which the liquid crystal and the radiator are in contact with each other, the antenna structure may have high-gain radiation performance by minimizing loss. Therefore, compared to an array antenna including a conventional phase shifter, a miniaturized antenna structure may be designed via minimized production cost while having a similar beam steering angle.

As another example, compared to an array antenna including a dielectric, the antenna structure according to embodiments of the disclosure may control the dielectric constant of a dielectric without an additional structure while minimizing loss caused by a transmission line. By minimizing the length of a transmission line (e.g., the first transmission line) in an area where a radiator, a liquid crystal, and an opening overlap, an antenna structure according to embodiments of the disclosure may minimize loss caused by the transmission line. In other words, unlike a spiral line or a meandering line used in a conventional structure, an antenna structure according to embodiments of the disclosure may minimize loss caused by a transmission line via a straight transmission line. In addition, the antenna structure according to embodiments of the disclosure may control the dielectric constant of a dielectric without an additional structure via a transmission line (e.g., a second transmission line) connected to the radiator for feeding DC power. An array antenna including a general dielectric requires an additional element for suppressing high-frequency components such as an RF choke when DC power is applied to control the dielectric constant of a dielectric. However, by connecting a transmission line (e.g., a second transmission line) for feeding DC power to a specific point (e.g., a point where the amount of change in electrical energy is minimal) of a radiator (e.g., a first antenna element) disposed in contact with a liquid crystal, an antenna structure according to embodiments of the disclosure may adjust the dielectric constant of a dielectric with an additional element. Accordingly, an antenna structure according to embodiments of the disclosure does not require additional element, and thus the antenna structure may be miniaturized and production costs may be reduced. In addition, as described above, in the antenna structure according to embodiments of the disclosure, a transmission line (e.g., a first transmission line) for an RF signal may be formed in a straight line structure, and thus a plurality of stacked structures are not required. In other words, the antenna structure of the disclosure does not require multiple transmission line paths (e.g., a spiral line or a meandering line) in an area corresponding to the area where a liquid crystal is disposed, and thus a stacked structure for including a plurality of transmission line paths in an area where liquid crystals are arranged may not be required. Therefore, the antenna structure according to embodiments of the disclosure may not only minimize loss caused by a transmission line, but also arrange a radiator in contact with a liquid crystal to improve radiation performance.

Figure 8:
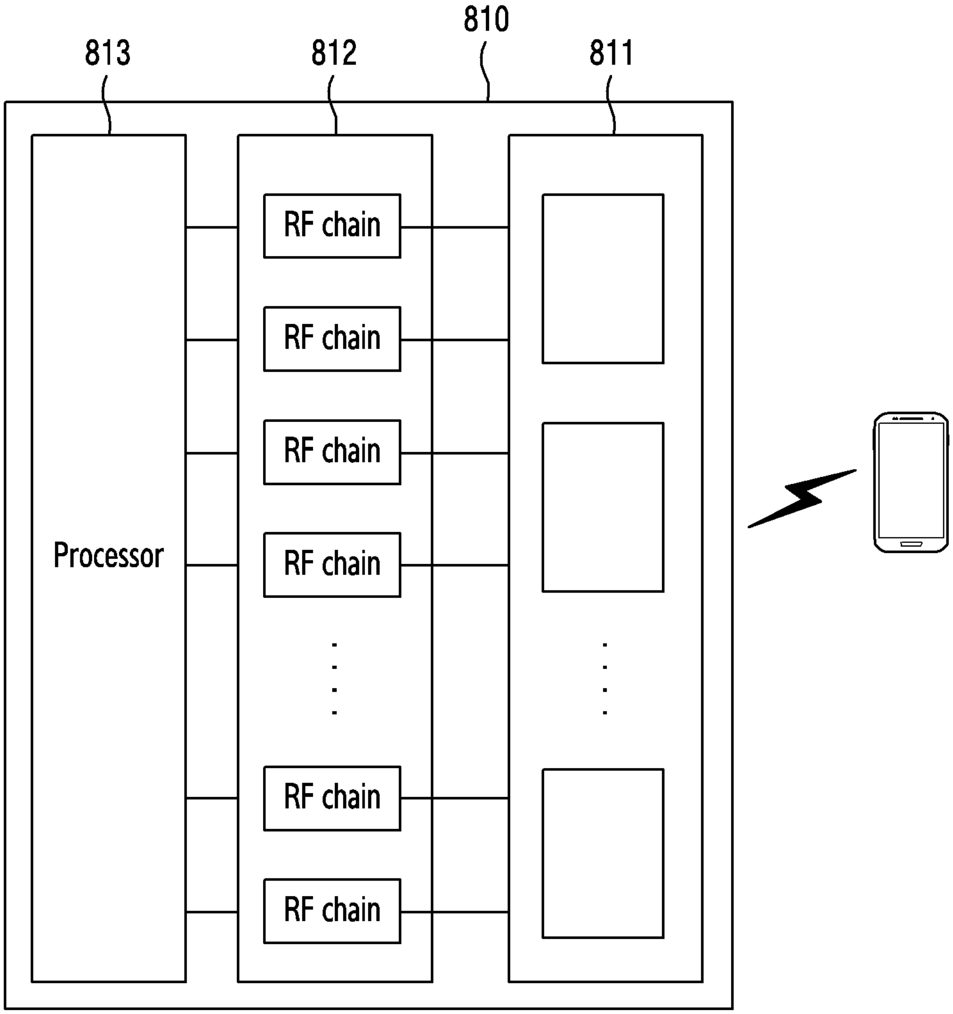
FIG. 8 shows a functional configuration of an electronic device according to embodiments of the disclosure.

FIG. 8 shows a functional configuration of an electronic device according to embodiments of the disclosure. An electronic device 810 may be one of a base station or a terminal. According to an embodiment, the electronic device 810 may be a device using a signal of a mmWave or terahertz (THz) band. Not only the antenna structure itself mentioned with reference to FIGS. 1 to 7, but also an electronic device including the antenna structure is included in embodiments of the disclosure.

Referring to FIG. 8, an exemplary functional configuration of the electronic device 810 is shown. The electronic device 810 may include an antenna unit 811, a radio frequency (RF) processor 812, and a controller 813.

The antenna unit 811 may include a plurality of antennas. The antenna performs functions for transmitting and receiving signals via a radio channel. The antenna may include a radiator including a conductor or a conductive pattern formed on a substrate (e.g., PCB). The antenna may radiate an up-converted signal on a radio channel or acquire a signal radiated by another device. Each antenna may be referred to as an antenna element or an antenna device. In some embodiments, the antenna unit 811 may include an antenna array (e.g., a sub-array (sub array)) in which a plurality of antenna elements form an array. The antenna unit 811 may be electrically connected to the filter unit via RF signal lines. The antenna unit 811 may be mounted on a PCB including a plurality of antenna elements. The PCB may include a plurality of RF signal lines connecting each antenna element and a filter of the filter unit. These RF signal lines may be referred to as a feeding network. The antenna unit 811 may provide the received signal to the filter unit or radiate the signal provided from the filter unit into the air. An antenna structure according to an embodiment of the disclosure may be included in the antenna unit 811 of FIG. 8.

The RF processing unit 812 may include a plurality of RF paths. An RF path may be a unit of a path through which a signal received via an antenna or a signal radiated via an antenna passes. At least one RF path may be referred to as an RF chain. The RF chain may include a plurality of RF elements. The RF elements may include a phase shifter, an amplifier, a mixer, an oscillator, a DAC, an ADC, and the like. For example, the RF processing unit 812 may include an up converter for up-converting a base band digital transmission signal to a transmission frequency, and a digital-to-analog converter (DAC) for converting the up-converted digital transmission signal into an analog RF transmission signal. The up converter and DAC form a part of a transmission path. The transmission path may further include a power amplifier (PA) or a coupler (or a combiner). In addition, for example, the RF processing unit 812 may include an analog-to-digital converter (ADC) for converting an analog RF reception signal into a digital reception signal and a down converter for converting the digital reception signal into a baseband digital reception signal. The ADC and the down converter form a part of a reception path. The reception path may further include a low-noise amplifier (LNA) or a coupler (or divider). The RF parts of the RF processing unit may be implemented on a PCB. The electronic device 810 may include a structure in which the antenna unit 811, the filter unit, and the RF processing unit 812 are stacked in this order. Antennas and RF parts of the RF processing unit may be implemented on a PCB, and filters may be repeatedly fastened between PCBs to form a plurality of layers. An antenna structure according to embodiments of the disclosure may adjust a signal phase using a liquid crystal instead of a phase shifter of the RF processing unit 812.

The controller 813 may control overall operations of the electronic device 810. The controller 814 may include various modules for performing communication. The controller 813 may include at least one processor such as a modem. The controller 813 may include modules for digital signal processing. For example, the controller 813 may include a modem. At the time of transmitting data, the controller 813 produces complex symbols by encoding and modulating the transmitted bit stream. In addition, for example, at the time of receiving data, the controller 813 restores a reception bit stream by demodulating and decoding a baseband signal. The controller 813 may perform protocol stack functions required by communication standards. The second transmission line of the antenna structure according to embodiments of the disclosure may be controlled by the controller 813 to allow DC power supplied to the first antenna element to be varied. Accordingly, the dielectric constant of the liquid crystal may be changed, and the phase of a signal supplied to the first antenna element may be adjusted.

In FIG. 8, a functional configuration of the electronic device 810 has been described as a device which may utilize the antenna structure of the disclosure. However, the example shown in FIG. 8 is only an exemplary configuration for utilizing the antenna structure according to various embodiments of the disclosure described via FIGS. 1 to 7, and embodiments of the disclosure are not limited to the elements of the equipment shown in FIG. 8. Therefore, an antenna structure according to embodiments of the disclosure, a communication device having another configuration including the antenna structure, or a method of manufacturing the antenna structure may also be understood as an embodiment of the disclosure.

According to an embodiment of the disclosure as described above, an antenna of a wireless communication system may include a first transmission line, a first layer including a plurality of openings, a second layer including a plurality of dielectrics, and a third layer on which a plurality of antenna elements corresponding to the plurality of dielectrics are arranged, wherein a first surface of each of the plurality of dielectrics is disposed to face the first layer, a second surface opposite to the first surface of each of the plurality of dielectrics is disposed to face the third layer, and each of the plurality of antenna elements is disposed to be located on a second surface of the corresponding dielectric among the plurality of dielectrics.

In an embodiment, the plurality of antenna elements are a plurality of first antenna elements arranged on a first surface of the third layer, and the antenna may further include a plurality of second antenna elements in an area of a second surface of the third layer, the second surface being opposite to the first surface of the third layer, the area of the second surface corresponding to the area in which the plurality of antenna elements are arranged.

In an embodiment, a plurality of second transmission lines connected to the plurality of antenna elements, respectively, may be further included.

In an embodiment, the plurality of antenna elements may be arranged along a first direction in which the first transmission line is disposed, each of the plurality of second transmission lines may be connected to a first point of the corresponding antenna element among the plurality of antenna elements, and the first point may be an area corresponding to the center of the length of the antenna element with respect to the first direction.

In an embodiment, the first transmission line and the plurality of second transmission lines may be arranged to be orthogonal to each other.

In an embodiment, the plurality of openings may correspond to the plurality of dielectrics, and each of the plurality of openings may be disposed to be positioned on a first surface of the corresponding dielectric among the plurality of dielectrics.

In an embodiment, the plurality of openings may include at least one of an H-shaped structure, an L-shaped structure, or a rectangular structure.

In an embodiment, the plurality of openings may be formed in a metal layer included in the first layer, and the metal layer may be a ground.

In an embodiment, the first transmission line may have a structure having a straight line shape.

In an embodiment, the plurality of dielectrics may have different dielectric constants (dielectric rates).

According to an embodiment of the disclosure as described above, an electronic device of a wireless communication system may include a plurality of array antennas including a first antenna array, a radio frequency integrated circuit (RFIC), and a board on which the plurality of array antennas and the RFIC are arranged, wherein the first antenna array includes a first transmission line, a first layer including a plurality of openings, a second layer including a plurality of dielectrics, and a third layer on which a plurality of antenna elements corresponding to the plurality of dielectrics are arranged, a first surface of each of the plurality of dielectrics is disposed to face the first layer, a second surface opposite to the first surface of each of the plurality of dielectrics is disposed to face the third layer, and each of the plurality of antenna elements is disposed to be located on a second surface of the corresponding dielectric among the plurality of dielectrics.

In an embodiment, the plurality of antenna elements are a plurality of first antenna elements arranged on a first surface of the third layer, and the electronic device may further include a plurality of second antenna elements in an area of a second surface of the third layer, the second surface being opposite to the first surface of the third layer, the area of the second surface corresponding to the area in which the plurality of antenna elements are arranged.

In an embodiment, a plurality of second transmission lines connected to the plurality of antenna elements, respectively, may be further included.

In an embodiment, the plurality of antenna elements may be arranged along a first direction in which the first transmission line is disposed, each of the plurality of second transmission lines may be connected to a first point of the corresponding antenna element among the plurality of antenna elements, and the first point may be an area corresponding to the center of the length of the antenna element with respect to the first direction.

In an embodiment, the first transmission line and the plurality of second transmission lines may be arranged to be orthogonal to each other.

In an embodiment, the plurality of openings may correspond to the plurality of dielectrics, and each of the plurality of openings may be disposed to be positioned in a first surface of the corresponding dielectric among the plurality of dielectrics.

In an embodiment, the plurality of openings may include at least one of an H-shaped structure, an L-shaped structure, or a rectangular structure.

In an embodiment, the plurality of openings may be formed in a metal layer included in the first layer, and the metal layer may be a ground.

In an embodiment, the first transmission line may have a structure having a straight line shape.

In an embodiment, the plurality of dielectrics may have different dielectric constants (dielectric rates).

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure.

The invention claimed is:

1. An antenna of a wireless communication system, the antenna comprising:

a first layer including a first transmission line transmitting a radio frequency (RF) signal and a metal layer having a plurality of openings through which the RF signal passes;

a second layer including a plurality of dielectrics changing a phase of the RF signal;

a third layer on which a plurality of first antenna elements corresponding to the plurality of dielectrics are arranged; and a plurality of second transmission lines directly connected to the plurality of first antenna elements, respectively, in the third layer, wherein a first surface of each of the plurality of dielectrics is oriented toward the first layer, wherein a second surface opposite to the first surface of each of the plurality of dielectrics is oriented toward the third layer, wherein each of the plurality of first antenna elements is arranged to correspond to at least one of the plurality of dielectrics, wherein each of the plurality of dielectrics has a dielectric constant which is variable based on a voltage applied to the second transmission lines, wherein the first transmission line is disposed on the first layer that is parallel to and spaced apart from the third layer, and wherein the first transmission line extends in a direction orthogonal to an extension direction of the plurality of second transmission lines in a plan view, wherein the plurality of first antenna elements are arranged along a first direction in which the first transmission line is disposed, wherein each of the plurality of second transmission lines is directly connected to a first point of a corresponding antenna element among the plurality of first antenna elements, wherein the first point includes an area corresponding to a center of a length of the corresponding antenna element with respect to the first direction, wherein the first point is located in a potential zero region in which electrical energy is zero or does not change with time, and wherein a spacing between adjacent first antenna elements is less than half a wavelength of an operating frequency.

2. The antenna of claim 1, wherein the plurality of first antenna elements are arranged on a first surface of the third layer, wherein the antenna further comprises a plurality of second antenna elements arranged on a second surface of the third layer, the second surface of the third layer is opposite to the first surface of the third layer, and wherein the plurality of second antenna elements correspond to the plurality of first antenna elements.

3. The antenna of claim 1, wherein the plurality of openings correspond to the plurality of dielectrics, and wherein each of the plurality of openings is disposed to be positioned in a first surface of a corresponding dielectric among the plurality of dielectrics.

4. The antenna of claim 1, wherein a structure of the plurality of openings comprises at least one of an H-shaped structure, an L-shaped structure, or a rectangular structure.

5. The antenna of claim 1, wherein the plurality of openings are formed in the metal layer included in the first layer, and wherein the metal layer is grounded.

6. The antenna of claim 1, wherein the first transmission line has a structure having a straight line shape.

7. The antenna of claim 1, wherein the plurality of dielectrics have different dielectric constants (dielectric rates).

8. An electronic device of a wireless communication system, the electronic device comprising:

a plurality of array antennas comprising a first antenna array;

a radio frequency integrated circuit (RFIC); and a board on which the plurality of array antennas and the RFIC are arranged, wherein the first antenna array comprises:

a first layer including a first transmission line transmitting a radio frequency (RF) signal and a metal layer having a plurality of openings through which the RF signal passes;

a second layer including a plurality of dielectrics changing a phase of the RF signal;

a third layer on which a plurality of first antenna elements corresponding to the plurality of dielectrics are arranged; and a plurality of second transmission lines directly connected to the plurality of first antenna elements, respectively, in the third layer, wherein a first surface of each of the plurality of dielectrics is oriented toward the first layer, wherein a second surface opposite to the first surface of each of the plurality of dielectrics is oriented toward the third layer, wherein each of the plurality of first antenna elements is arranged to correspond to at least one of the plurality of dielectrics, wherein each of the plurality of dielectrics has a dielectric constant which is variable based on a voltage applied to the second transmission lines, wherein the first transmission line is disposed on the first layer that is parallel to and spaced apart from the third layer, and wherein the first transmission line extends in a direction orthogonal to an extension direction of the plurality of second transmission lines in a plan view, wherein the plurality of first antenna elements are arranged along a first direction in which the first transmission line is disposed, wherein each of the plurality of second transmission lines is directly connected to a first point of a corresponding antenna element among the plurality of first antenna elements, wherein the first point includes an area corresponding to a center of a length of the corresponding antenna element with respect to the first direction, wherein the first point is located in a potential zero region in which electrical energy is zero or does not change with time, and wherein a spacing between adjacent first antenna elements is less than half a wavelength of an operating frequency.

9. The electronic device of claim 8, wherein the plurality of first antenna elements are arranged on a first surface of the third layer, wherein the electronic device further comprises a plurality of second antenna elements arranged on a second surface of the third layer, the second surface of the third layer is opposite to the first surface of the third layer, and wherein the plurality of second antenna elements correspond to the plurality of first antenna elements.

* * * * *